US012529991B2

(12) United States Patent
Takuwa

(10) Patent No.: US 12,529,991 B2
(45) Date of Patent: Jan. 20, 2026

(54) IMAGE FORMING APPARATUS INCLUDING POWER SUPPLY UNIT ADJACENT TO INTERNAL SHEET DISCHARGE SPACE

(71) Applicant: TOSHIBA TEC KABUSHIKI KAISHA, Tokyo (JP)

(72) Inventor: Noriyuki Takuwa, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/668,427

(22) Filed: May 20, 2024

(65) Prior Publication Data

US 2025/0138467 A1 May 1, 2025

(30) Foreign Application Priority Data

Nov. 1, 2023 (JP) ................................ 2023-187879

(51) Int. Cl.
*G03G 15/00* (2006.01)
*G03G 21/20* (2006.01)

(52) U.S. Cl.
CPC .......... *G03G 15/80* (2013.01); *G03G 21/206* (2013.01); *G03G 2215/00978* (2013.01); *G03G 2221/1645* (2013.01)

(58) Field of Classification Search
CPC ................ G03G 15/80; G03G 21/206; G03G 2215/00978; G03G 2221/1645
USPC ........................................................ 399/92
See application file for complete search history.

(56) References Cited

U.S. PATENT DOCUMENTS

| | | | | |
|---|---|---|---|---|
| 2007/0110469 A1* | 5/2007 | Kasai | G03G 15/6552 | 399/93 |
| 2007/0116489 A1* | 5/2007 | Kim | G03G 21/206 | 399/92 |
| 2008/0240767 A1* | 10/2008 | Asahina | G03G 21/206 | 399/92 |
| 2009/0214247 A1* | 8/2009 | Takuwa | G03G 15/80 | 399/88 |
| 2014/0376949 A1* | 12/2014 | Fujita | G03G 21/206 | 399/92 |
| 2016/0187834 A1* | 6/2016 | Matsuno | G03G 21/1652 | 399/92 |
| 2016/0357145 A1* | 12/2016 | Yoshimura | G03G 15/6573 | |
| 2017/0017199 A1* | 1/2017 | Tanaka | G03G 15/6552 | |
| 2017/0257985 A1 | 9/2017 | Souda | | |
| 2019/0263147 A1* | 8/2019 | Nagahara | G03G 15/50 | |
| 2022/0128948 A1* | 4/2022 | Shuhama | G03G 21/206 | |
| 2022/0171321 A1* | 6/2022 | Hirabayashi | G03G 15/80 | |
| 2024/0397615 A1* | 11/2024 | Shinotsuka | G03G 15/50 | |

FOREIGN PATENT DOCUMENTS

JP 2015-87627 5/2015

* cited by examiner

*Primary Examiner* — Robert B Beatty
(74) *Attorney, Agent, or Firm* — Amin, Turocy & Watson, LLP

(57) ABSTRACT

Provided is an image forming apparatus that is unlikely to fail due to heat from a power supply unit. The image forming apparatus includes a housing having a space for internal sheet discharging, and a power supply unit provided in the housing and adjacent to the space.

18 Claims, 15 Drawing Sheets

IMAGE FORMING APPARATUS INCLUDING POWER SUPPLY UNIT ADJACENT TO INTERNAL SHEET DISCHARGE SPACE

CROSS-REFERENCE TO RELATED APPLICATION

This application is based upon and claims the benefit of priority from Japanese Patent Application No. 2023-187879, filed on Nov. 1, 2023, the entire contents of which are incorporated herein by reference.

FIELD

Embodiments described herein relate generally to an image forming apparatus such as a copier or a printer installed in a workplace.

BACKGROUND

An image forming apparatus such as a copier or a printer includes: a scanner that reads an image of a document; an exposure device that forms an electrostatic latent image on a surface of a photoconductor drum; a developing device that supplies toner to the electrostatic latent image formed on the surface of the photoconductor drum and performs development; a conveyance device that conveys a sheet to the surface of the photoconductor drum; a transfer device that transfers a toner image formed on the surface of the photoconductor drum to a sheet; a fixing device that fixes the toner image transferred to the sheet; and the like.

The image forming apparatus also includes a power supply unit including a power supply circuit that supplies power to the units. Since the power supply circuit includes an electronic component having a high temperature such as a transformer, the power supply unit becomes a heat generation source of the image forming apparatus.

DETAILED DESCRIPTION

Figure 1:
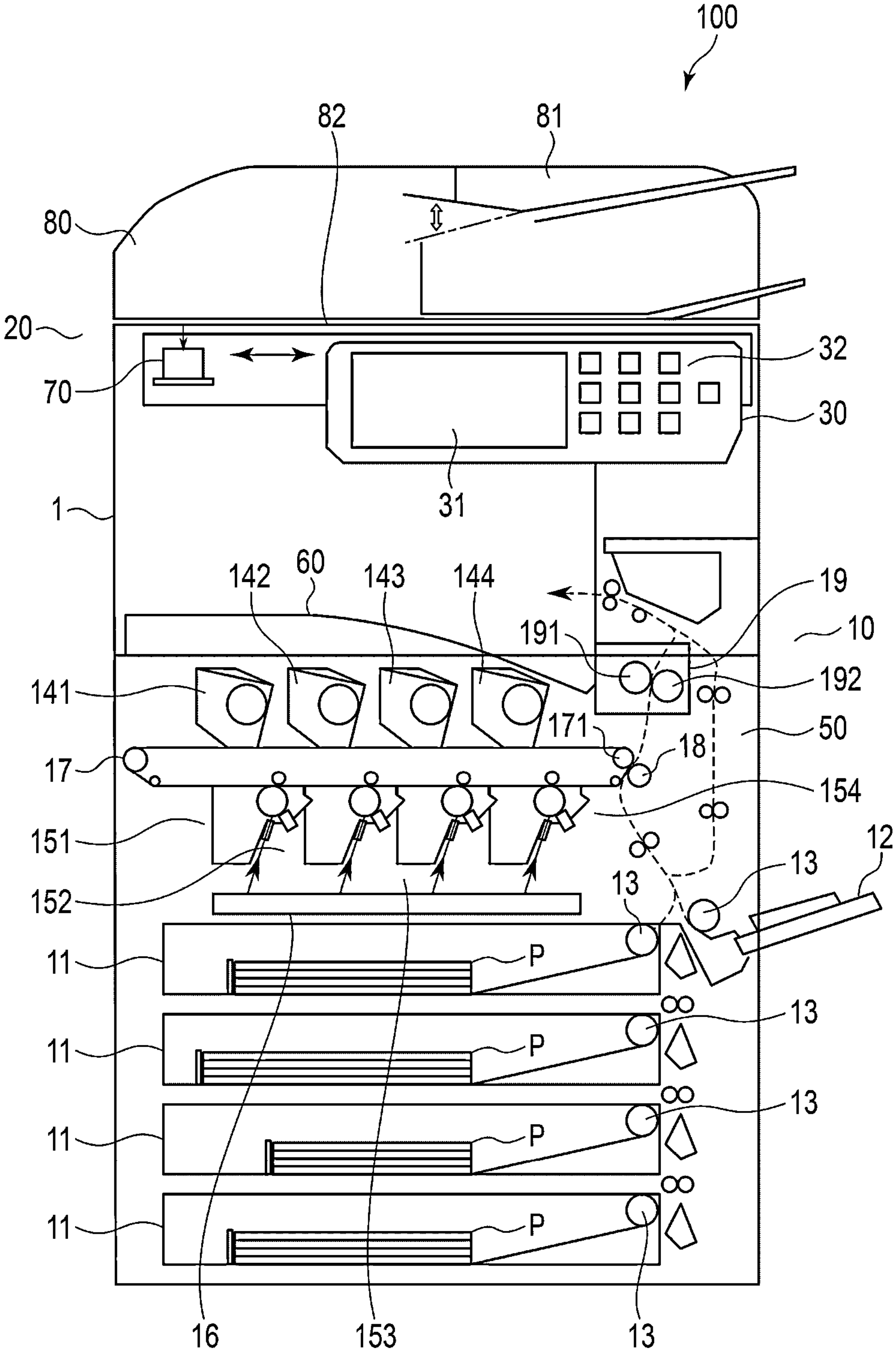
FIG. 1 is a schematic diagram showing an image forming apparatus according to an embodiment.

The developing device includes a toner cartridge that contains toner to be supplied to the photoconductor drum. The toner may be melted or fixed by heat. Therefore, when the power supply unit that is a heat generation source is located near the toner cartridge, a failure in which toner is melted or fixed may occur.

In general, according to one embodiment, an image forming apparatus that is unlikely to fail due to heat from a power supply unit is provided.

An image forming apparatus according to an embodiment includes: a housing having a space for internal sheet discharging; and a power supply unit provided in the housing and adjacent to the space.

Hereinafter, an image forming apparatus 100 (hereinafter, simply referred to as an apparatus 100) according to an embodiment will be described with reference to the drawings. In the drawings used in description of the following embodiments, a scale of each part may be appropriately changed. Further, in the drawings used in description of the following embodiments, in order to make the description easy to understand, configurations may be omitted.

The apparatus 100 is, for example, a multifunction peripheral (MFP). The apparatus 100 implements a printing function, a scanning function, a copying function, a decoloring function, a facsimile function, and the like. The printing function is a function of forming an image on a sheet P. The scanning function is a function of reading an image from a document or the like where the image is formed. The copying function is, for example, a function of printing, an image read from a document or the like by using the scanning function, on the sheet P by using the printing function. The decoloring function is a function of decoloring an image formed on the sheet P with a decolorable toner.

As shown in FIG. 1, the apparatus 100 includes a housing 1 that forms an outer shell of the apparatus. The apparatus 100 includes a printer 10, a scanner 20, and an operation panel 30. In the apparatus 100, the printer 10 and the scanner 20 are provided inside the housing 1, and the operation panel 30 is provided on a front surface of the housing 1. In the following description, a front-rear direction, an upper-lower direction, and a left-right direction are defined when the apparatus 100 is viewed from a direction in FIG. 1.

The printer 10 includes a plurality of sheet feeding cassettes 11, a manual feed tray 12, and a plurality of sheet feeding rollers 13. The sheet feeding cassettes 11 house the sheet P used for printing. The manual feed tray 12 is for manually feeding the sheet P. The sheet feeding roller 13 selectively picks up the sheet P from any one of the sheet feeding cassette 11 and the manual feed tray 12 by being rotated.

The printer 10 includes four toner cartridges 141, 142, 143, and 144, four image forming units 151, 152, 153, and 154, an exposure device 16, a transfer belt 17, a secondary transfer roller 18, and a fixing device 19.

The toner cartridges 141 to 144 contain toner to be supplied to the image forming units 151 to 154, respectively. The toner cartridge 141 contains toner of yellow (Y). The toner cartridge 142 contains toner of magenta (M). The toner cartridge 143 contains toner of cyan (C). The toner cartridge 144 contains toner of black (K). A combination of colors of the toner is not limited to YMCK, and may be a combination of other colors. Further, the toner may be toner that decolors at a temperature higher than a predetermined temperature.

The image forming units 151 to 154 receive a supply of toner from the toner cartridges 141 to 144, and form toner images having different colors. The image forming unit 151 forms a toner image of yellow (Y). The image forming unit 152 forms a toner image of magenta (M). The image forming unit 153 forms a toner image of cyan (C). The image forming unit 154 forms a toner image of black (K).

Figure 2:
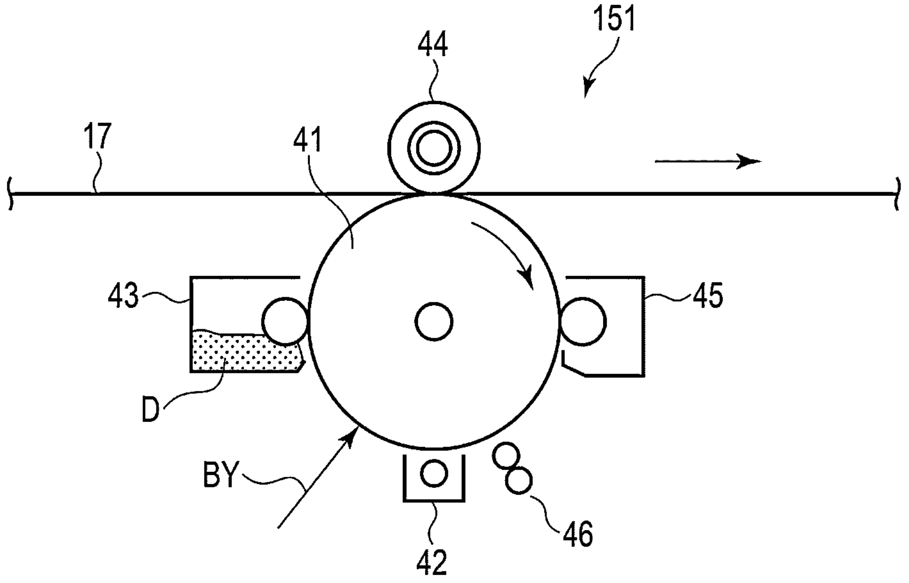
FIG. 2 is a schematic diagram showing an image forming unit for yellow.

The image forming units 151 to 154 have the same configuration except for a difference in the toner. Therefore, here, the image forming unit 151 for yellow will be representatively described with reference to FIG. 2, and description of the image forming units 152 to 154 for other colors will be omitted.

The image forming unit 151 for yellow includes a photoconductor drum 41, a charging device 42, a developing device 43, a primary transfer roller 44, a cleaner 45, and a static elimination lamp 46.

The photoconductor drum 41 has a surface that receives a light beam BY radiated from the exposure device 16. The charging device 42 charges the surface of the photoconductor drum 41 with negative charges. The exposure device 16 forms an electrostatic latent image on the surface of the photoconductor drum 41. The developing device 43 develops the electrostatic latent image on the surface of the photoconductor drum 41 by using toner D of yellow supplied from the toner cartridge 141. That is, the developing device 43 forms a toner image of yellow on the surface of the photoconductor drum 41.

In the image forming unit 151, the primary transfer roller 44 is provided at a position facing the surface of the photoconductor drum 41 with the transfer belt 17 sandwiched therebetween. The primary transfer roller 44 causes a transfer voltage to occur between the primary transfer roller 44 and the photoconductor drum 41. Accordingly, the primary transfer roller 44 transfers (primarily transfers) the toner image on the surface of the photoconductor drum 41 to a surface of the transfer belt 17 in contact with the photoconductor drum 41.

The cleaner 45 removes the toner remaining on the surface of the photoconductor drum 41. The static elimination lamp 46 removes the charges remaining on the surface of the photoconductor drum 41.

The exposure device 16 radiates light beams BY, BM, BC, and BK to surfaces of the photoconductor drums 41 of the image forming units 151, 152, 153, and 154 according to input image data. The light beams BY, BM, BC, and BK are based on image data of colors obtained by color-separating the image data into Y, M, C, and K colors.

The exposure device 16 emits the light beam BY according to image data of a Y component, and forms an electrostatic latent image for yellow on the surface of the photoconductor drum 41 of the image forming unit 151. Similarly, the exposure device 16 emits the light beams BM, BC, and BK according to image data of M, C, and K components, and forms electrostatic latent images for the respective colors on the surfaces of the photoconductor drums 41 of the image forming units 152, 153, and 154.

The image data input to the exposure device 16 is, for example, image data read from a document or the like by the scanner 20. Alternatively, the image data input to the exposure device 16 is image data transmitted to the apparatus 100 from an apparatus different from the apparatus 100.

As shown in FIG. 1, the transfer belt 17 is stretched in an endless shape, and is rotated by rotating a driving roller 171 around which the transfer belt 17 is wound. The transfer belt 17, by being rotated, conveys the toner images of the respective colors formed in an overlapping manner on the surface of the transfer belt 17 by the image forming units 151 to 154 to a transfer region faced by the secondary transfer roller 18.

The secondary transfer roller 18 faces the driving roller 171 with the transfer belt 17 sandwiched therebetween. The secondary transfer roller 18 transfers (secondarily transfers) a toner image formed on the transfer belt 17 onto the sheet P that passes between the secondary transfer roller 18 and the transfer belt 17.

The fixing device 19 heats and pressurizes the sheet P. The fixing device 19 includes a heating roller 191 and a pressurizing roller 192 that face each other with a conveyance path of the sheet P sandwiched therebetween. The heating roller 191 includes a heat source such as a heater. The heating roller 191 heated by the heat source comes into contact with the sheet P to heat the sheet P. The pressurizing roller 192 pressurizes the sheet P that passes between the pressurizing roller 192 and the heating roller 191. Therefore, the fixing device 19 fixes a toner image transferred onto the sheet P onto the sheet P.

The printer 10 further includes a duplex unit 50 and a discharge tray 60. The duplex unit 50 brings the sheet P into a state where printing on a back surface is possible. The duplex unit 50 reverses a front side and a back side of the sheet P by switching back the sheet P, and feeds the sheet P to the transfer region between the transfer belt 17 and the secondary transfer roller 18. The discharge tray 60 is for discharging the sheet P on which printing is ended.

The scanner 20 reads an image from a document or the like. The scanner 20 includes a reading module 70 and a document feeder 80.

The reading module 70 applies illumination light to a surface of a document including an image to be read (hereinafter, referred to as a document surface), receives reflected light thereof by an image sensor (not shown), and converts the received reflected light into a digital signal. Accordingly, the reading module 70 reads the image from the document surface.

The document feeder 80 is, for example, an auto document feeder (ADF). The document feeder 80 sequentially conveys documents placed on a document tray 81 through document glass 82. The reading module 70 reads an image from a document conveyed to the document glass 82. The document feeder 80 may include another reading module for reading an image from a back surface of a document.

The operation panel 30 is a man-machine interface that performs input and output between the apparatus 100 and an operator of the apparatus 100. The operation panel 30 includes, for example, a touch panel 31 and an input device 32.

The touch panel 31 is formed by, for example, stacking a display such as a liquid crystal display or an organic EL display and a pointing device based on touch input. The display of the touch panel 31 displays a screen for notifying the operator of the apparatus 100 of various kinds of information. Further, the touch panel 31 receives a touch operation performed by the operator.

The input device 32 receives an operation performed by the operator of the apparatus 100. The input device 32 is, for example, a keyboard, a keypad, or a touch pad.

Figure 3:
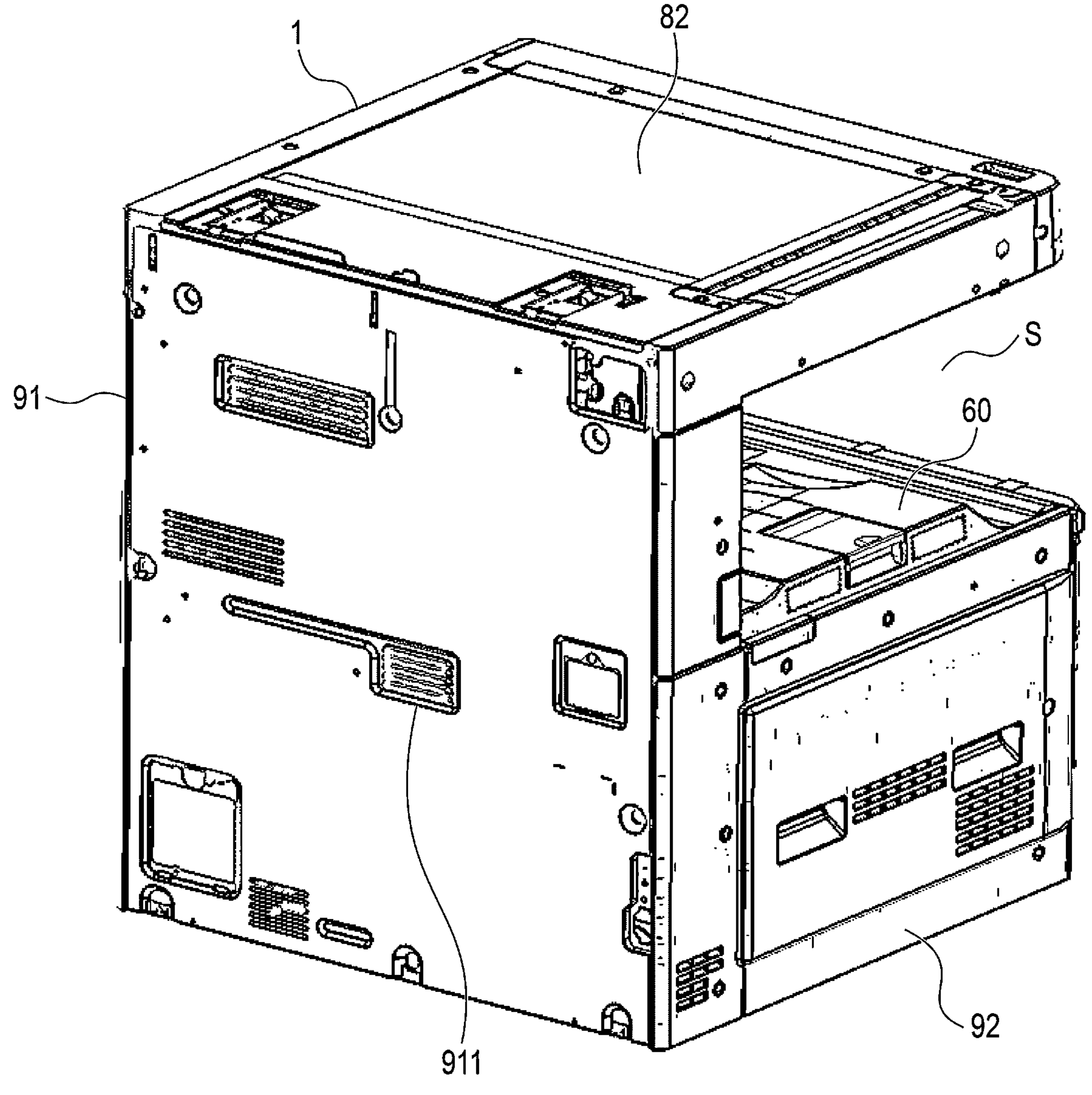
FIG. 3 is a perspective view of main parts when viewed obliquely from a rear left side.
Figure 4:
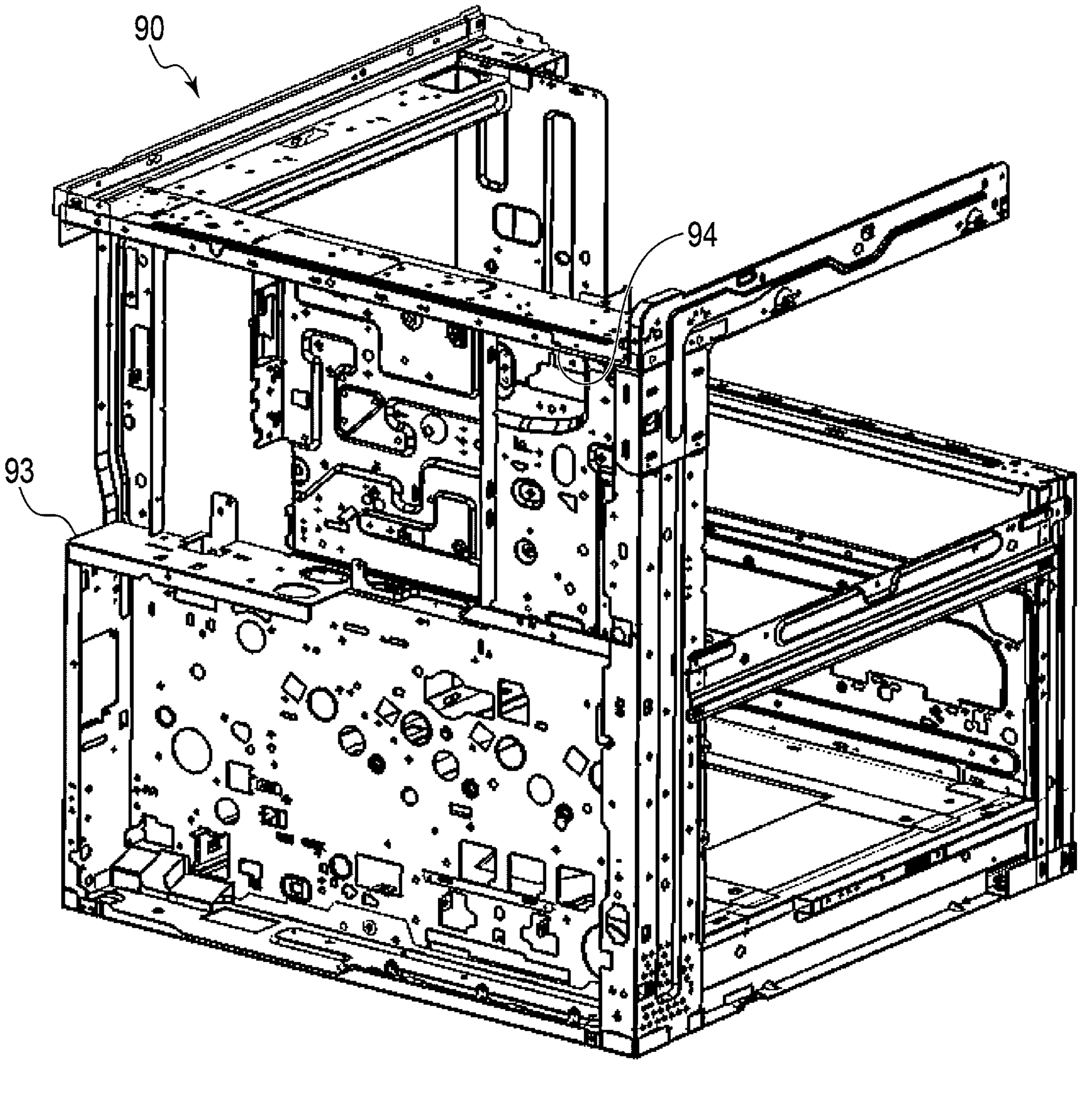
FIG. 4 is a perspective view showing a frame of a housing in FIG. 3.

FIG. 3 is a perspective view of the housing 1 of the apparatus 100 when viewed obliquely from a rear left side. FIG. 4 is a perspective view showing only a frame 90 with an exterior panel being removed from the housing 1 in FIG. 3. FIGS. 3 and 4 show a state where an optional device of a sheet feeding system including the plurality of sheet feeding cassettes 11 is removed from the apparatus 100 in FIG. 1.

As shown in FIG. 3, the housing 1 includes a rear panel 91 on a rear side of the frame 90, and includes side panels 92 at left and right side surfaces of the frame 90 (only a left side is shown here). The discharge tray 60 is located at a height of upper ends of the left and right side panels 92. Above the discharge tray 60, there is a space S for discharging (internally discharging) the sheet P on which an image is formed to inside of the housing 1.

Figure 5:
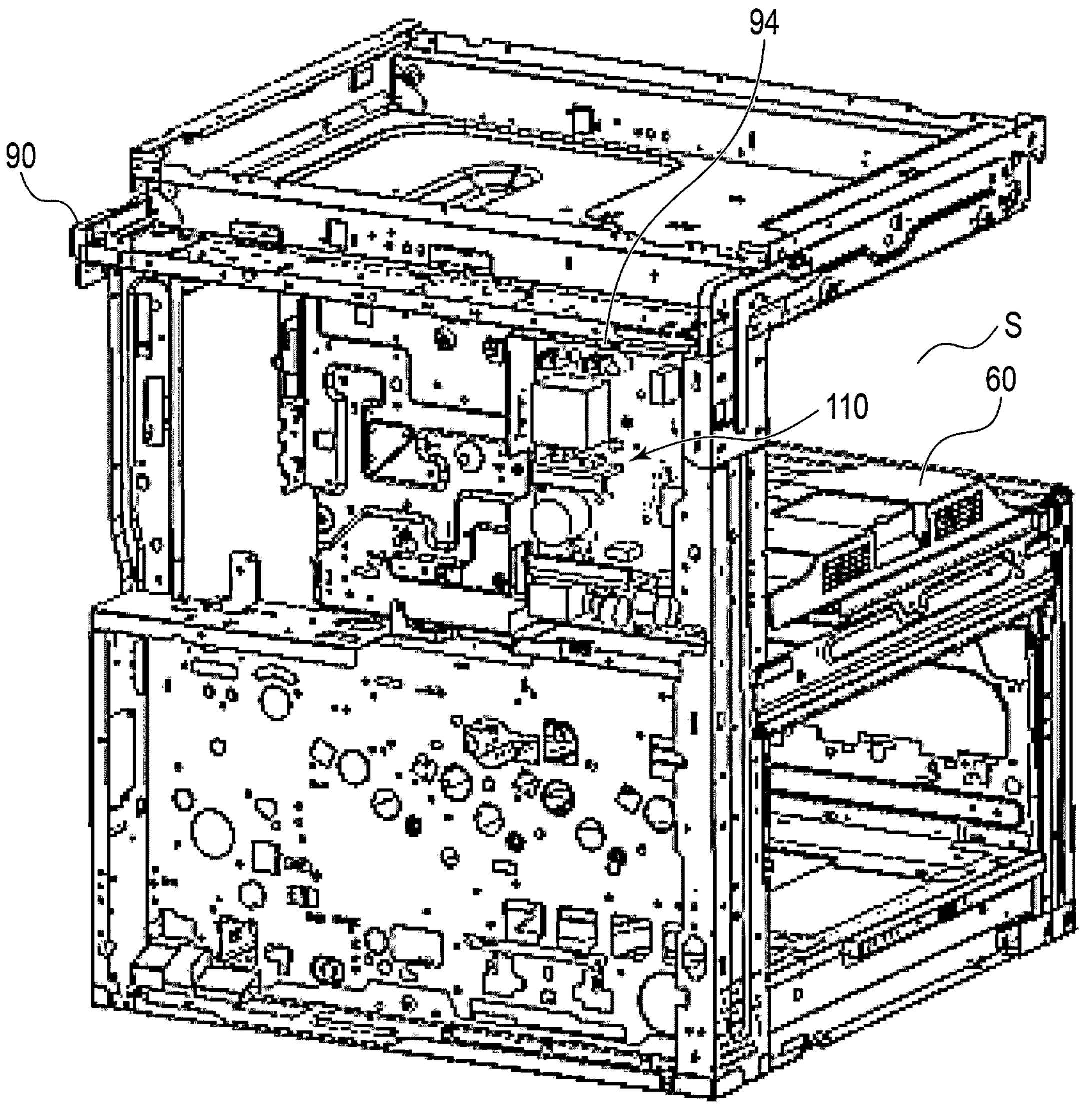
FIG. 5 is a perspective view showing a state where a power supply unit is attached to an opening portion.

As shown in FIG. 4, the frame 90 includes a rear frame 93 that extends in an upper-lower direction and a left-right direction on a rear side of the apparatus 100. The rear frame 93 is formed of a sheet metal, and has a substantially rectangular opening portion 94 for attaching a power supply unit 110 as shown in FIG. 5. FIG. 5 shows a state where a cover 111 (FIG. 8) on a back surface side is removed from the power supply unit 110. The opening portion 94 is located at a position offset to an upper left side of the rear frame 93. The rear panel 91 (FIG. 3) is attached to cover a back surface side of the rear frame 93 behind the power supply unit 110.

Figure 6:
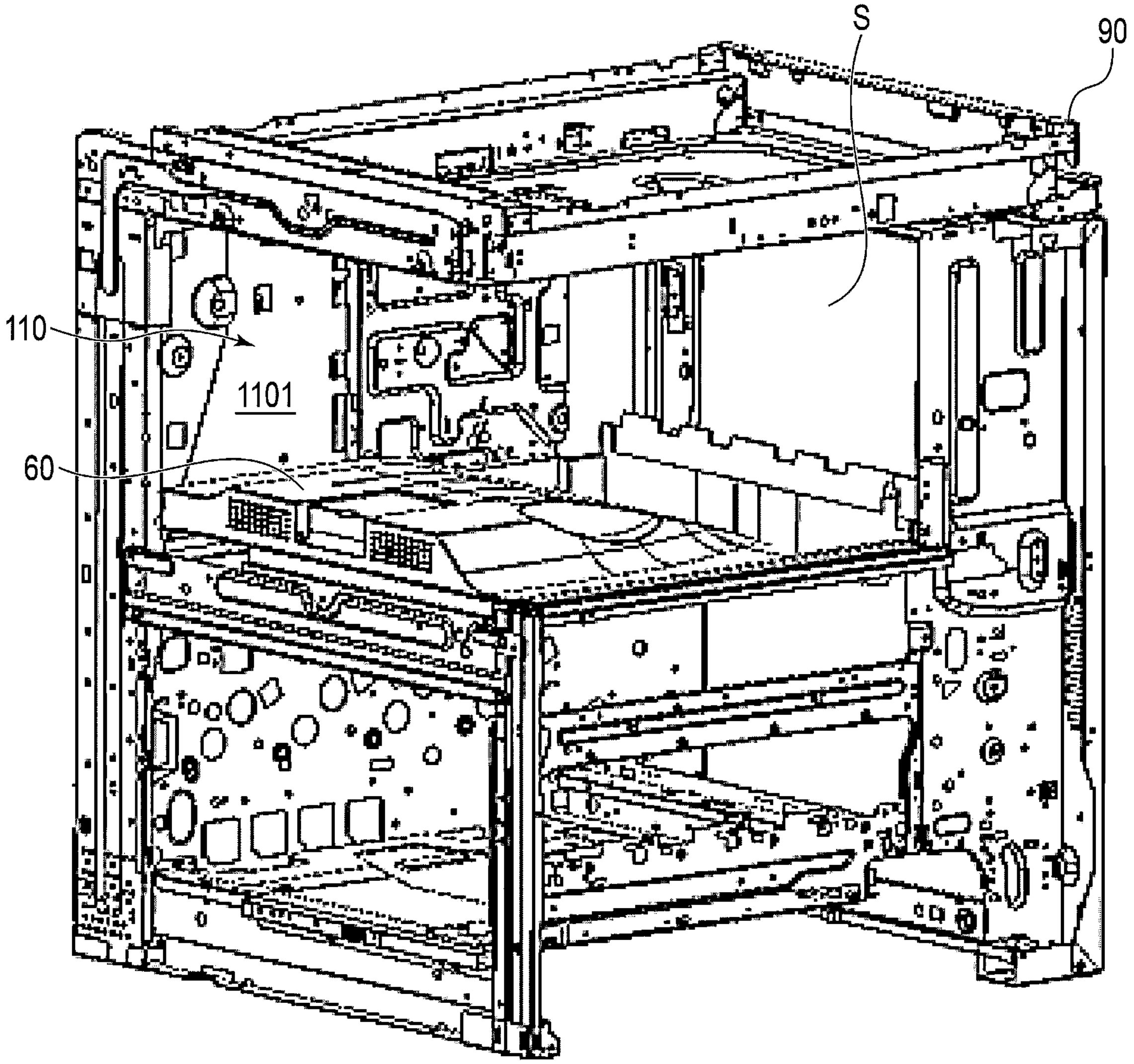
FIG. 6 is a perspective view of the power supply unit when viewed from a discharge tray side.

The opening portion 94 of the rear frame 93 is located at a position facing the space S above the discharge tray 60. Therefore, as shown in FIG. 6, when the opening portion 94 of the rear frame 93 is seen from the space S above the discharge tray 60, a front surface 1101 of the power supply unit 110 can be seen from the opening portion 94 by being exposed to the space S.

Figure 10:
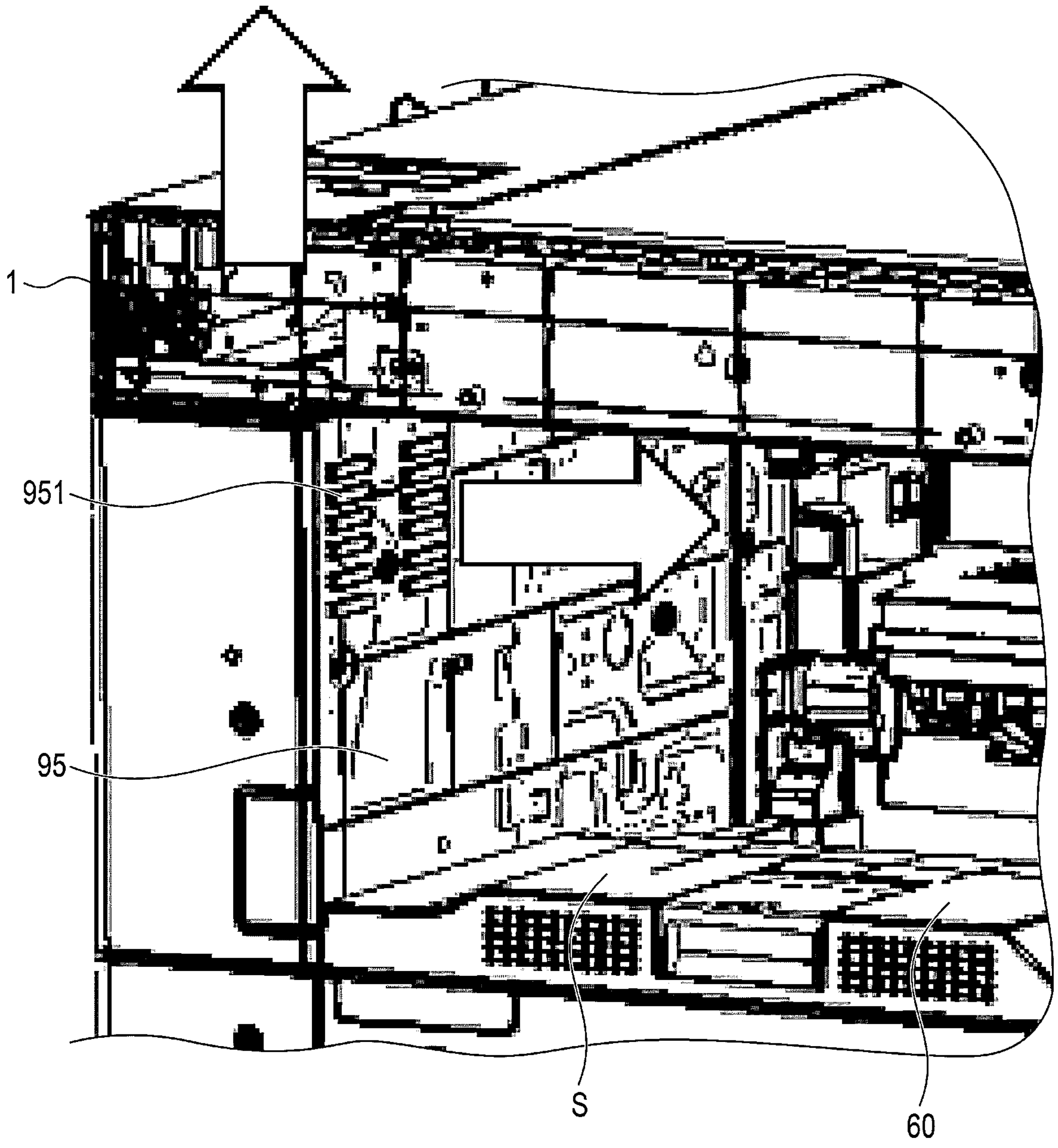
FIG. 10 is a perspective view illustrating a heat dissipation path.

However, since an inner panel 95 (FIGS. 10 and 11) that covers the opening portion 94 is present behind the space S, that is, before the rear frame 93, the power supply unit 110 actually cannot be seen from the space S. That is, the power supply unit 110 is located at a position adjacent to a rear side of the space S with the inner panel 95 that functions as a partition wall sandwiched therebetween. Further, the inner panel 95 has a plurality of slit-shaped ventilation holes 951 (FIGS. 10 and 11) for ventilation at positions facing the power supply unit 110. The ventilation holes 951 are provided for cooling the power supply unit 110.

Figure 7:
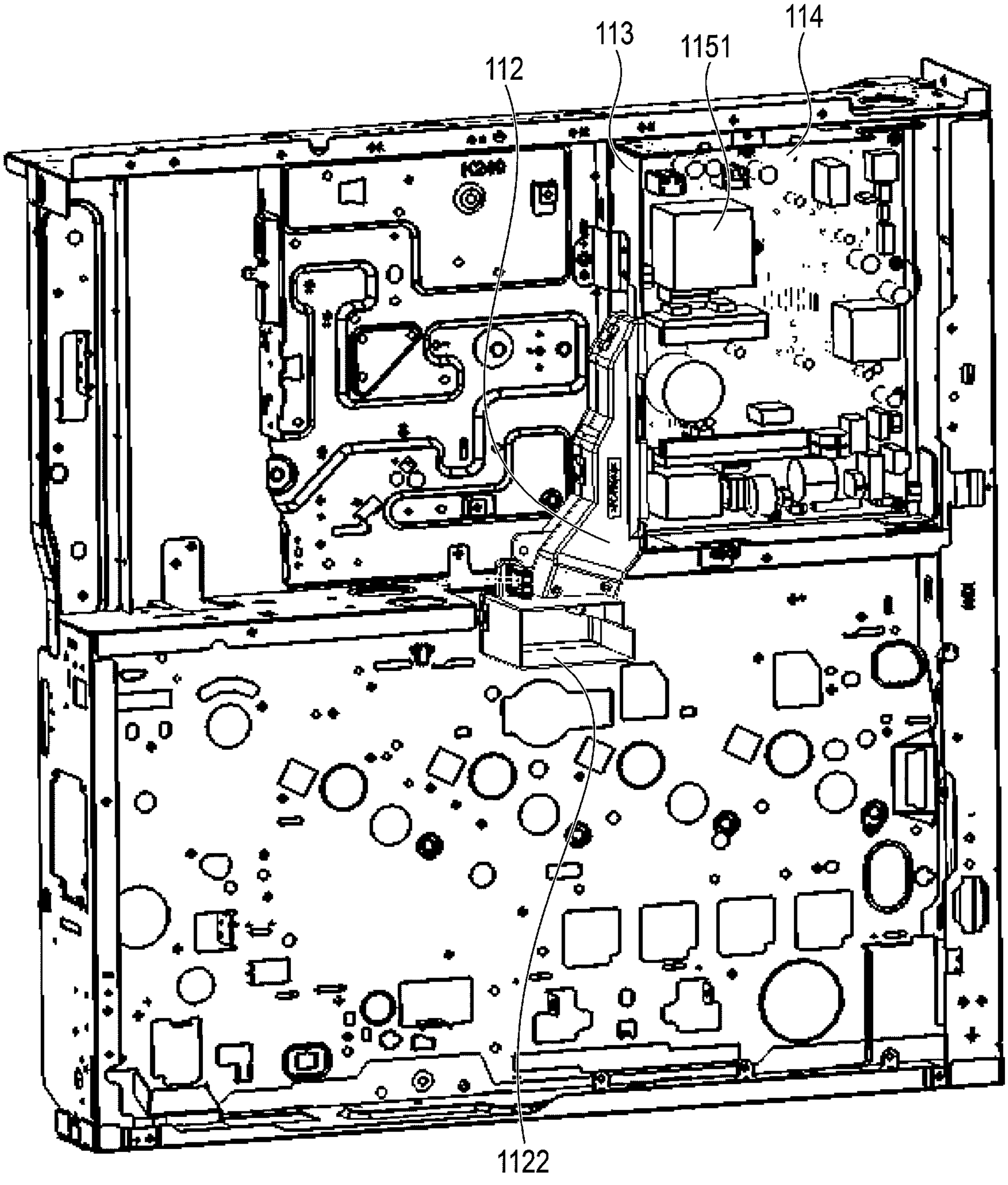
FIG. 7 is a perspective view showing a rear frame in FIG. 5.
Figure 8:
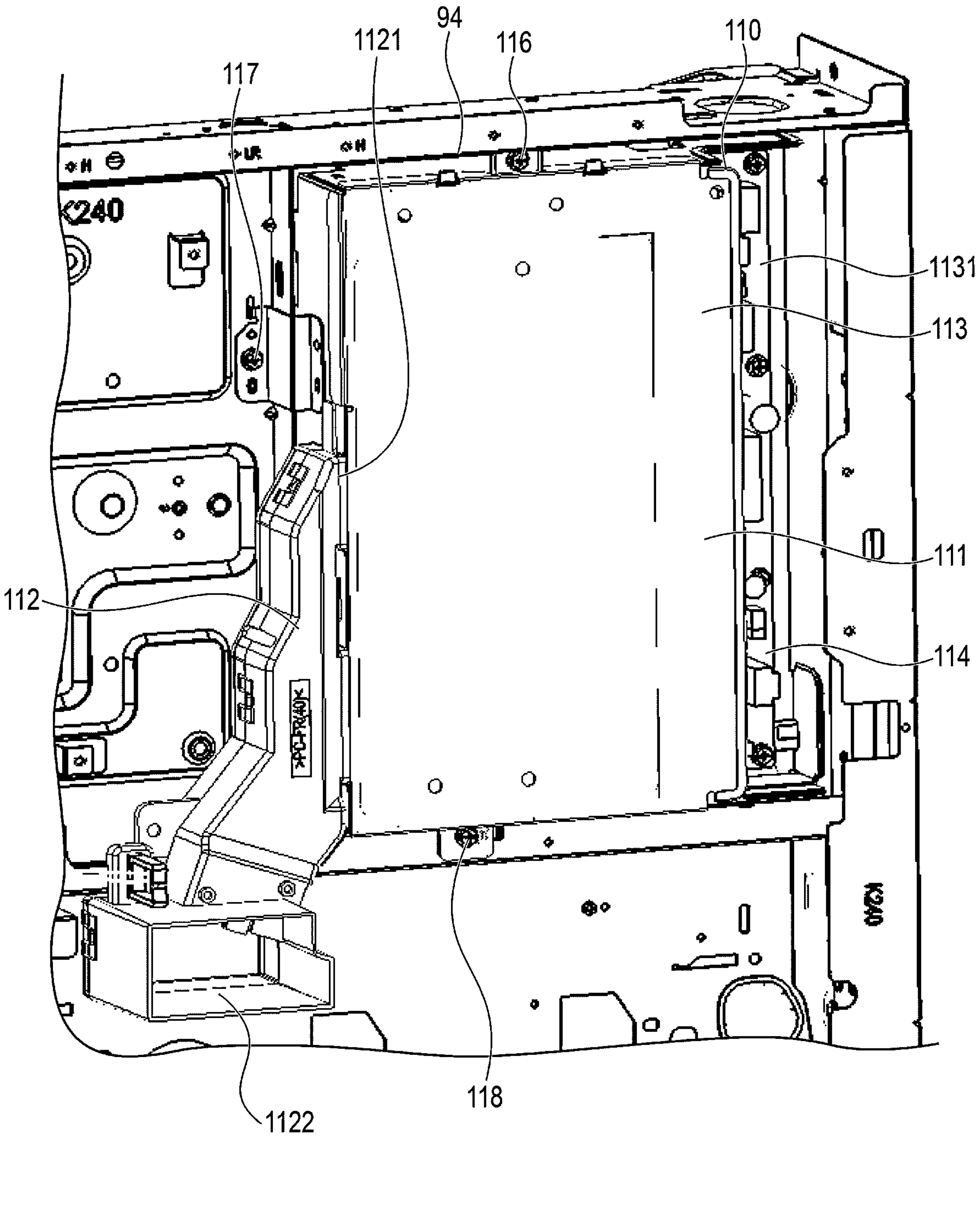
FIG. 8 is a partially enlarged perspective view showing main parts in FIG. 7 in a partial enlargement manner.

As shown in FIGS. 7 and 8, the power supply unit 110 includes a cooling duct 112. The cooling duct 112 has an exhaust port 1121 that communicates with an internal space of a case 113 of the power supply unit 110, and a suction port 1122 opened toward a rear side of the rear frame 93. A blower fan (not shown) is provided in the cooling duct 112. The suction port 1122 of the cooling duct 112 is located at a position facing a plurality of slit-shaped ventilation holes 911 (FIG. 3) of the rear panel 91. The case 113 of the power supply unit 110 has an exhaust port 1131 obtained by largely opening a left end surface on a side opposite to the exhaust port 1121 of the cooling duct 112.

Figure 9:
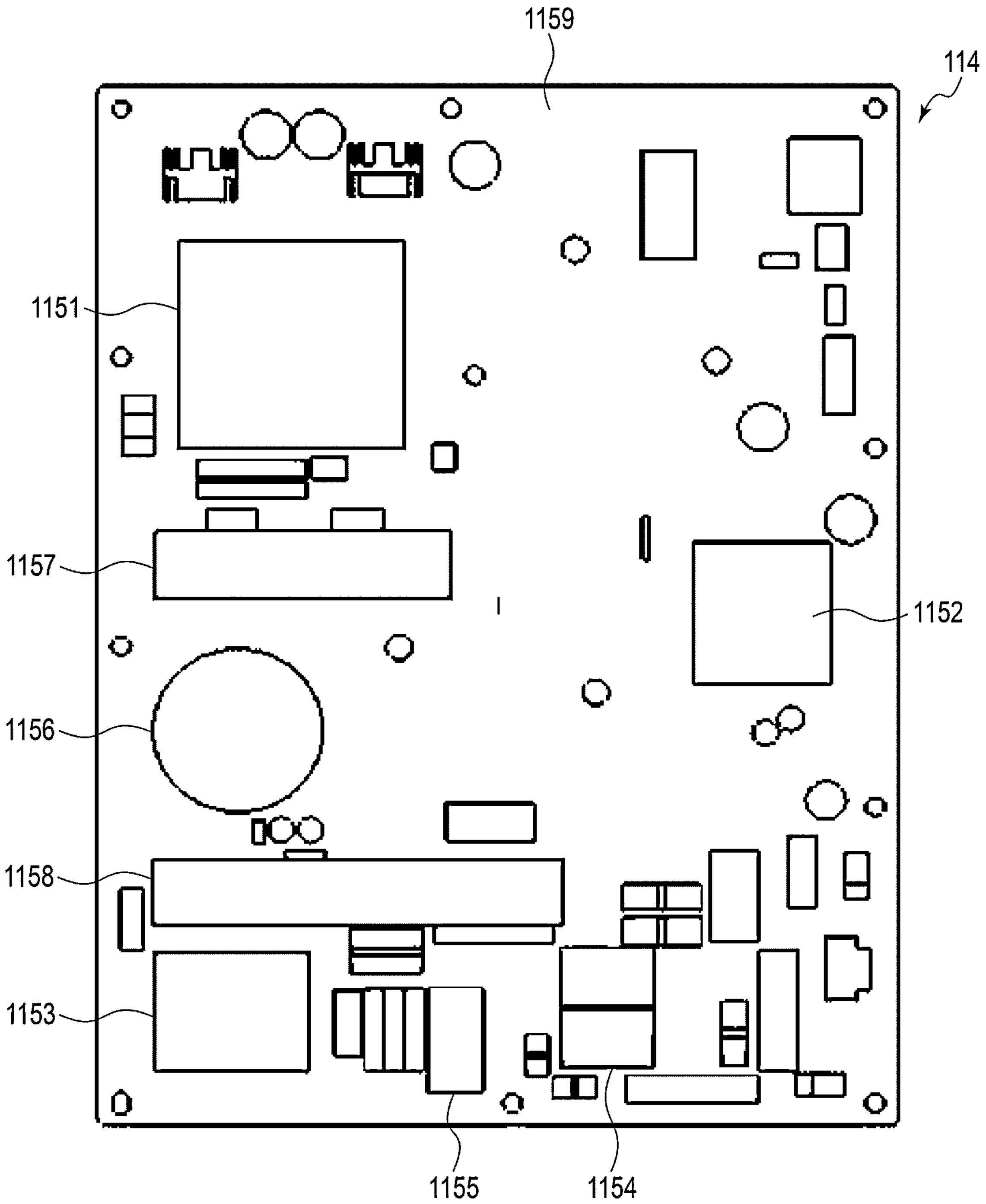
FIG. 9 is a diagram showing a power supply circuit board housed in a case.

In the power supply unit 110, a power supply circuit board 114 shown in FIG. 9 is housed in the case 113. In the power supply circuit board 114, a plurality of electronic components including two transformers 1151 and 1152, three choke coils 1153, 1154, and 1155, a capacitor 1156, and two heat sinks 1157 and 1158 are mounted on a board 1159. Electronic components having highest temperatures among the plurality of above-described electronic components mounted on the board 1159 are the transformer 1151 and the heat sink 1157. That is, the power supply circuit board 114 has a highest temperature near an upper right portion in a state where the power supply unit 110 is attached to the opening portion 94 of the rear frame 93.

When the blower fan of the cooling duct 112 is rotated, outside air flows into the case 113 of the power supply unit 110 via the ventilation holes 911 of the rear panel 91 and the suction port 1122 of the cooling duct 112, and is discharged via the exhaust port 1131 of the case 113. As indicated by arrows in FIG. 10, hot air that flows among the plurality of electronic components on the power supply circuit board 114 and is exhausted from the exhaust port 1131 can be released to outside of the apparatus 100 via the plurality of ventilation holes 951 in communication with the space S and a gap of the housing 1.

Figure 11:
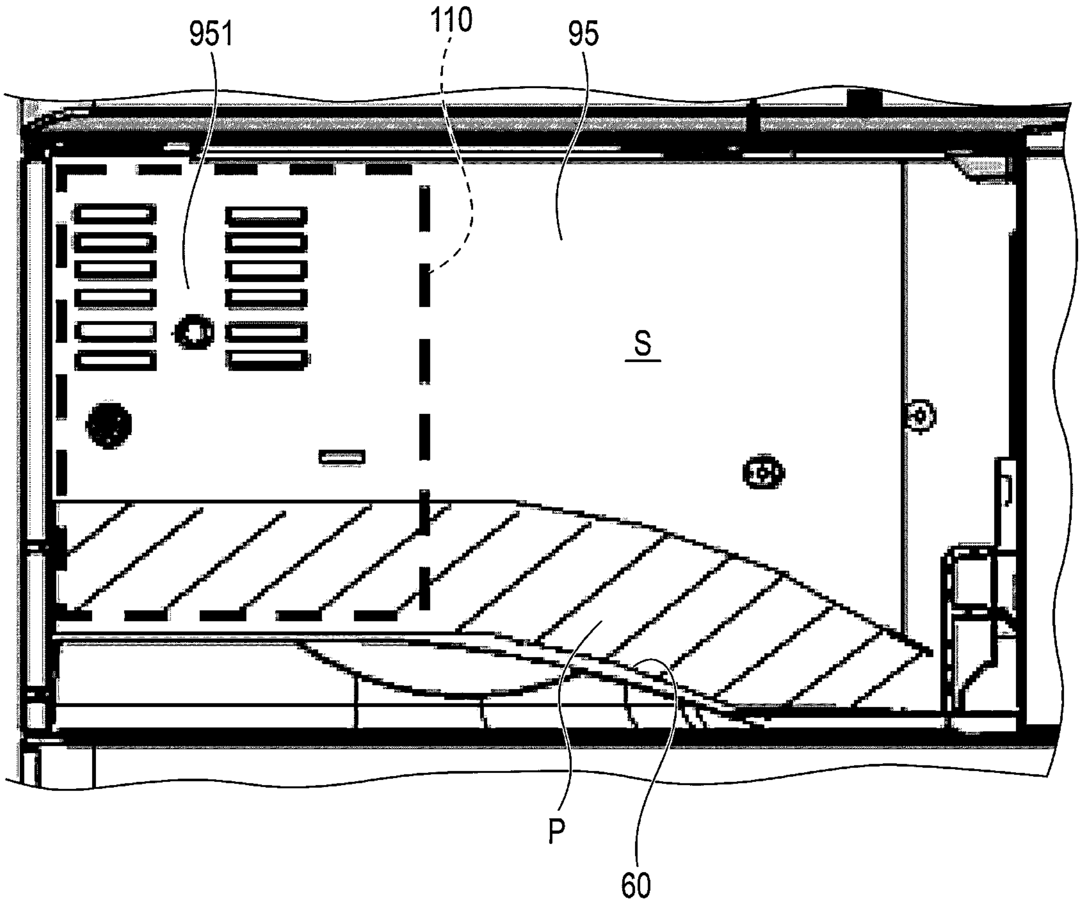
FIG. 11 is a front view of ventilation holes in FIG. 10 when viewed from the discharge tray side.

As shown in FIG. 11, the plurality of ventilation holes 951 provided in the inner panel 95 are located at positions offset to an upper left side when viewed from the space S. The positions are positions facing the power supply unit 110 (a contour is indicated by a broken line in FIG. 11) on a rear side of the inner panel 95. When the plurality of ventilation holes 951 are provided at the positions, the ventilation holes 951 are unlikely to overlap the sheets P (in FIG. 11, positions where a plurality of sheets P are stacked are indicated by diagonal lines) discharged onto the discharge tray 60, and the hot air can be effectively discharged into the space S through the ventilation holes 951.

According to the present embodiment, since the power supply unit 110 that is a heat generation source is disposed adjacent to the space S for internally discharging the sheets P on which printing is ended, and the plurality of ventilation holes 951 are provided at the positions facing the power supply unit 110 of the inner panel 95, which is between the power supply unit 110 and the space S, it is possible to effectively dissipate heat of the power supply unit 110 via the space S where there is no member easily influenced by heat of the toner cartridges 141 to 144 or the like. Therefore, according to the present embodiment, the toner contained in the toner cartridges 141 to 144 are not heated, and a failure in which toner is melted or fixed by heat does not occur.

Hereinafter, other effects of the present embodiment will be described with reference to FIGS. 7, 8, and 12 to 15.

The power supply unit 110 is disposed in the opening portion 94 of the rear frame 93 as shown in FIG. 7, and is fastened and fixed to the rear frame 93 by using three screws 116, 117, and 118 as shown in FIG. 8. The power supply unit 110 is attached to the rear frame 93 by fastening and fixing a part of an upper end of the case 113 to the rear frame 93 by the screw 116, fastening and fixing a part of a right end of the case 113 to the rear frame 93 by the screw 117, and fastening and fixing a part of a lower end of the case 113 to the rear frame 93 by the screw 118.

In this way, the power supply unit 110 is fixed to and integrated with the rear frame 93 such that the opening portion 94 provided in the rear frame 93 is closed by the power supply unit 110, so that the case 113 of the power supply unit 110 can be formed as a part of the rear frame 93, and mechanical strength of the rear frame 93 can be increased. Further, a periphery of the case 113 of the power supply unit 110 is brought into contact with and fixed to the rear frame 93 made of a sheet metal, so that it is possible to enhance heat dissipation effects of the power supply unit 110.

Figure 12:
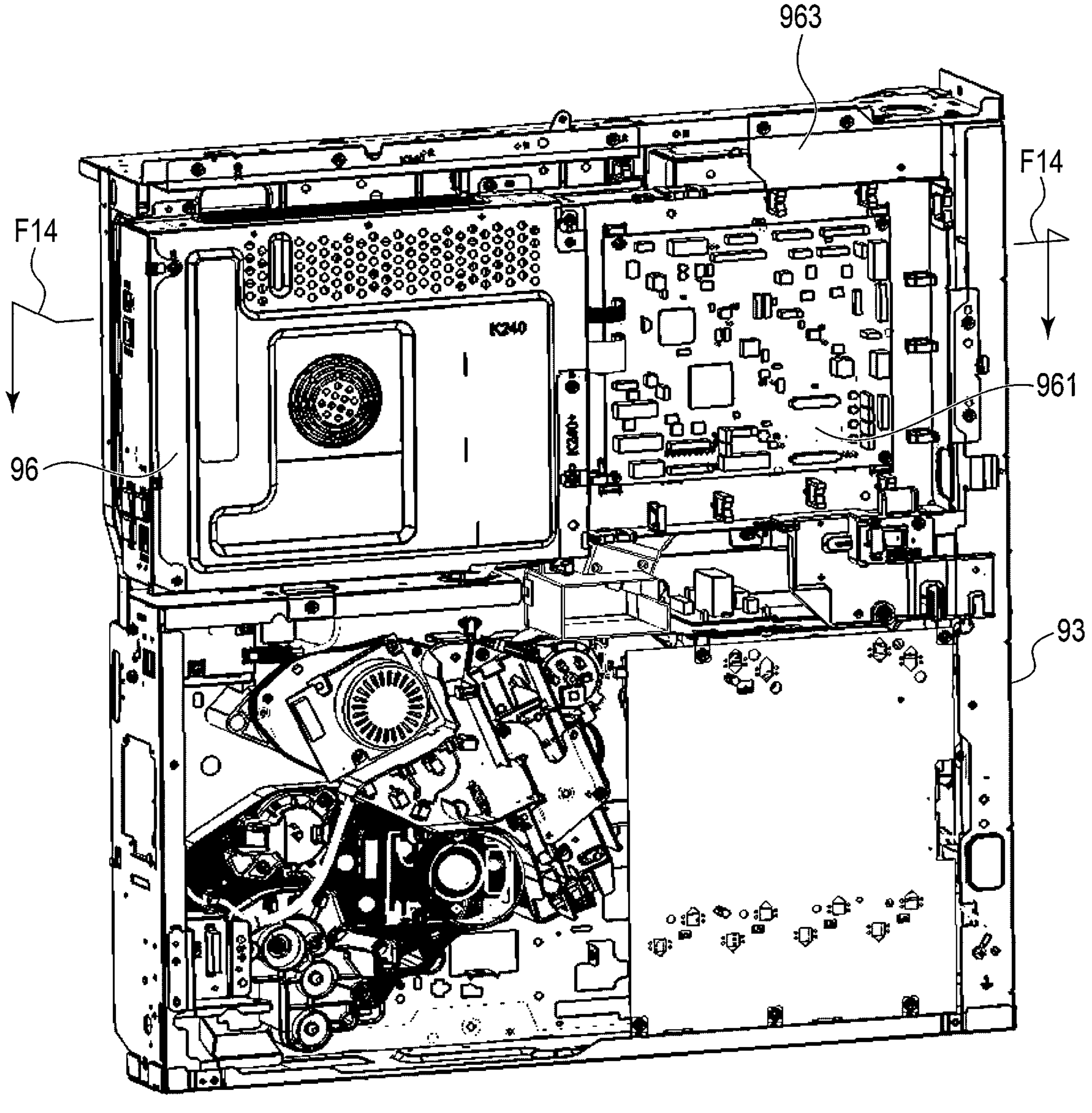
FIG. 12 is a perspective view of the rear frame showing a state where a board unit is attached to the power supply unit in an overlapping manner.
Figure 13:
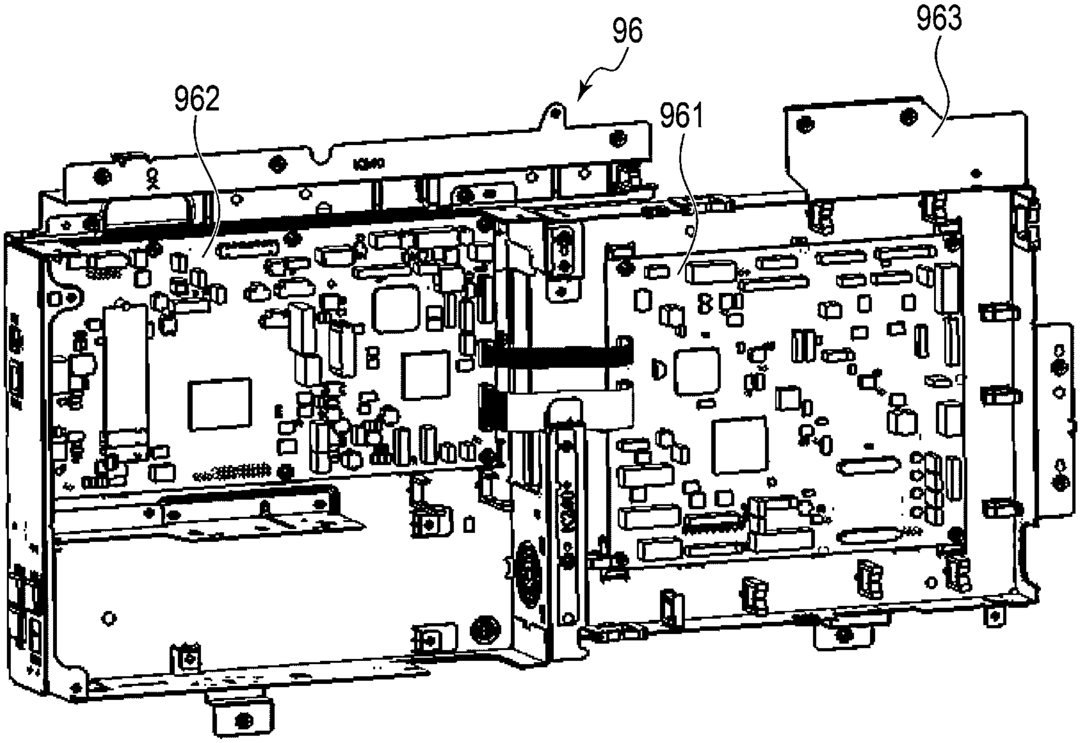
FIG. 13 is a perspective view showing two control boards.

As shown in FIG. 12, the rear frame 93 includes, in addition to the power supply unit 110, a driving mechanism such as a motor or a clutch and a board unit 96. As shown in FIG. 13, in the board unit 96, two control boards 961 and 962 are arranged in a left-right direction and attached to a board case 963. The control boards 961 and 962 are, for example, a logic board and a system board. The logic board mainly performs control based on an application program by using firmware or a logic circuit. The system board mainly performs communication and print job. The two control boards 961 and 962 receive power supply from the power supply circuit board 114.

Figure 14:
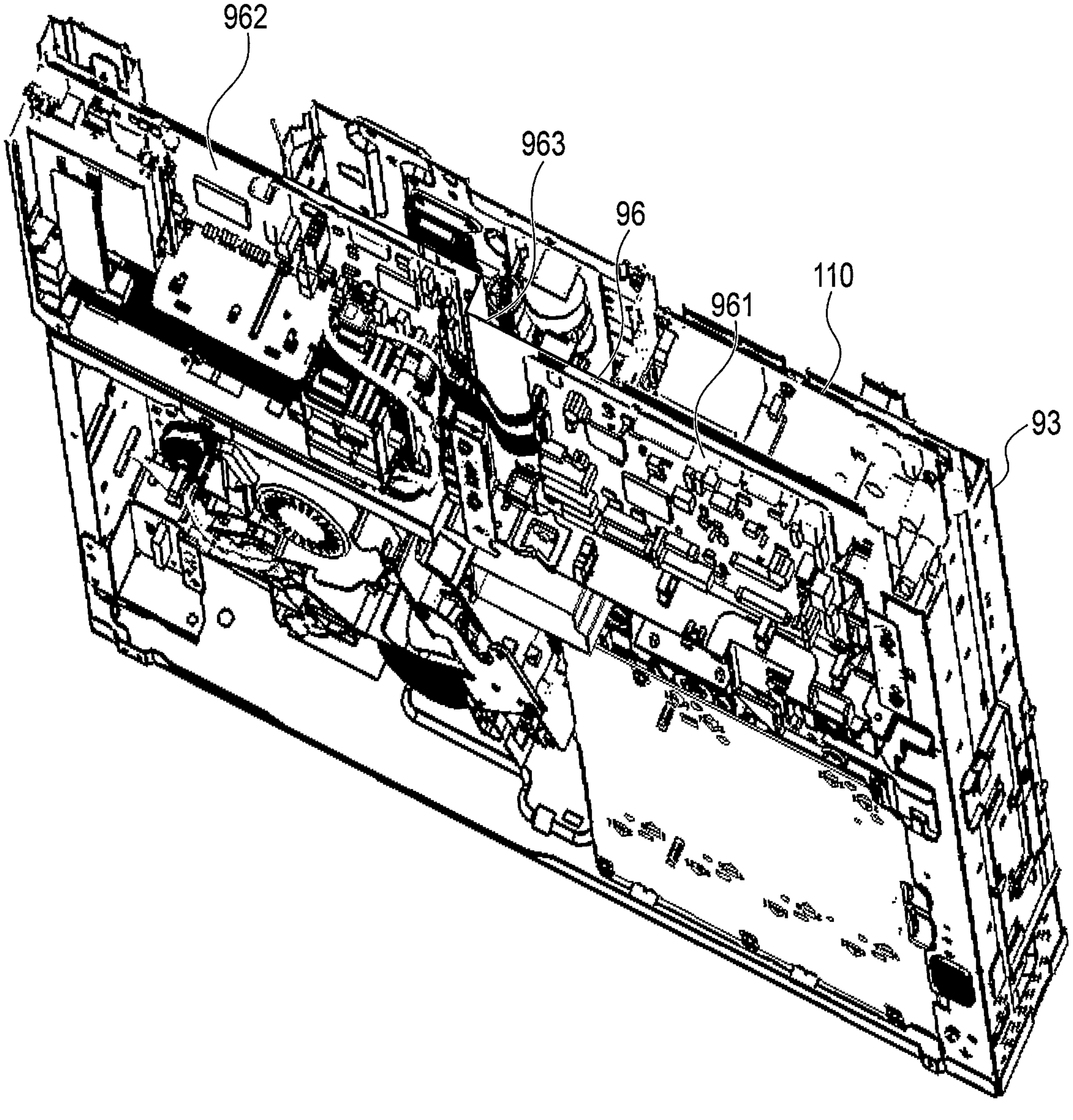
FIG. 14 is a cross-sectional perspective view taken along arrows F14-F14 in FIG. 12.

After the power supply unit 110 is attached to the opening portion 94 of the rear frame 93, the board unit 96 is attached to the rear frame 93 so as to cover a back surface side of the power supply unit 110. The board unit 96 is attached by fixing the board case 963 to the rear frame 93. Therefore, in FIG. 12, the power supply unit 110 is hidden behind the board unit 96 and cannot be seen. As shown in FIG. 14, the power supply unit 110 and the board unit 96 are disposed in a front-rear direction in an overlapping manner, and are fixed to the rear frame 93, so that it is possible to further increase the mechanical strength of the rear frame 93.

Figure 15:
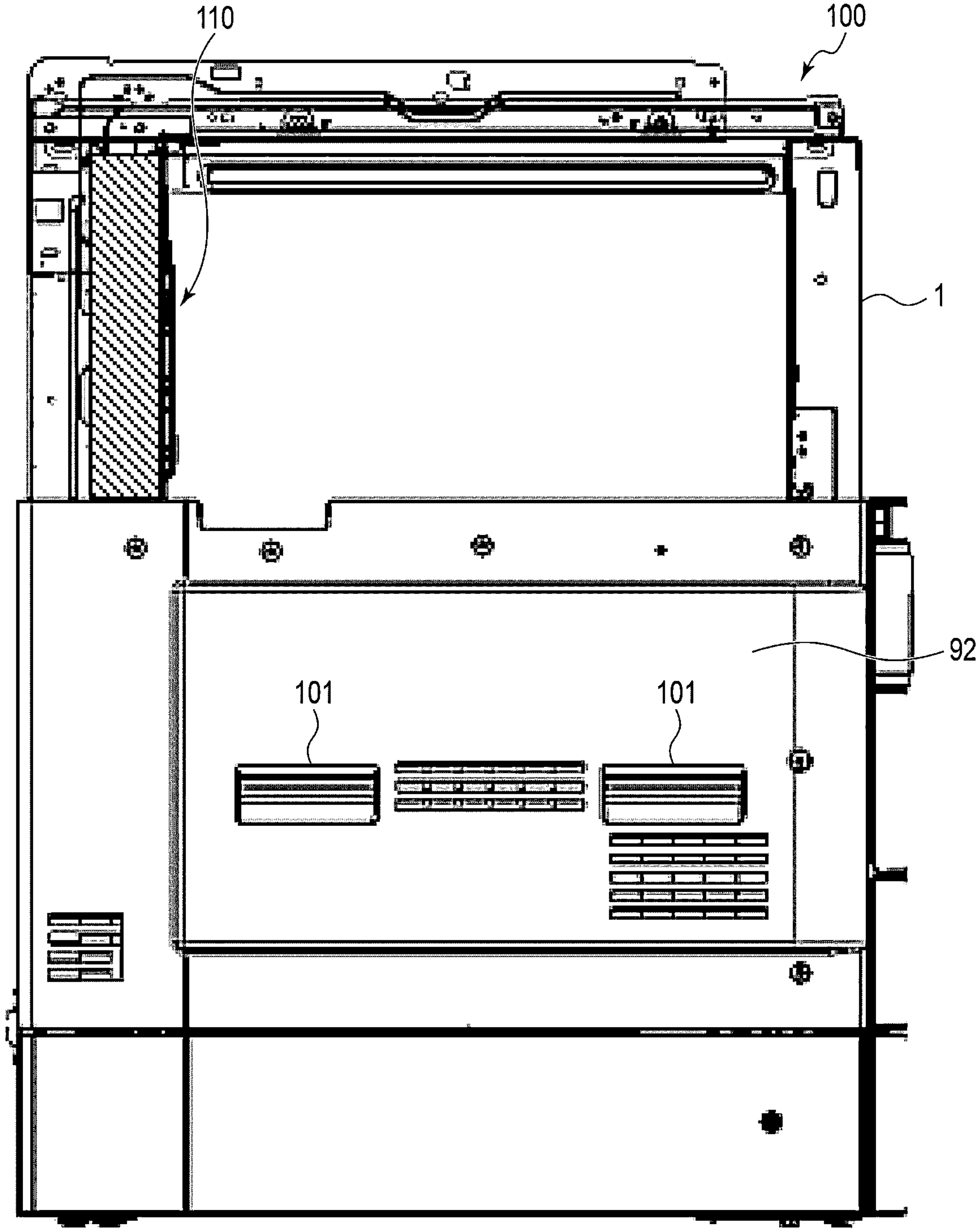
FIG. 15 is a diagram illustrating a weight balance.

The power supply unit 110 is attached in the opening portion 94 of the rear frame 93, and the board unit 96 is disposed in an overlapping manner on the back surface side, so that the relatively heavy power supply unit 110 can be attached near a front side of the apparatus 100. Therefore, as shown in FIG. 15, the power supply unit 110 can be disposed slightly on a front side with respect to a back surface of the housing 1 of the apparatus 100, and a degree to which a center of gravity of the apparatus 100 offsets to a rear side can be controlled. Accordingly, when a worker lifts the apparatus 100 by holding two handles provided at the side panels 92 of the housing 1, a weight difference applied to both hands can be reduced, and a weight balance between the left and right hands can be improved to some extent.

The exemplary embodiment has been described above, but the embodiment described above has been presented by way of example, and is not intended to limit the scope of the exemplary embodiment. The embodiment described above can be implemented in various other forms, and various omissions, substitutions, and changes can be made in a scope not departing from the gist of the exemplary embodiment. The detailed embodiment and modifications thereof are included in a scope and a gist of the exemplary embodiment, and are included in a scope of the exemplary embodiment described in the claims and equivalents thereof.

Hereinafter, other embodiments will be additionally described.

1. Among electronic components that generate heat, an electronic component having a highest temperature is located at a position adjacent to the space.
2. The electronic component having the highest temperature is a transformer.
3. A power supply unit includes a cooling duct.
4. A suction port of the cooling duct communicates with a suction hole provided in a back surface of a housing.
5. An exhaust port of the cooling duct communicates with inside of a case of the power supply unit.

What is claimed is:

1. An image forming apparatus, comprising:
- a housing having a space for internal sheet discharging; and
- a power supply unit provided in the housing and adjacent to the space,
- wherein
  - the power supply unit includes a heat-generating electronic component, and the heat-generating electronic component is located at a position adjacent to the space,
  - the housing has a partition wall on the power supply unit side of the space, and
  - the partition wall has a ventilation hole penetrating from the space toward the power supply unit side at a position facing the power supply unit.

2. The image forming apparatus according to claim 1, further comprising:
- a discharge tray configured to stack sheets discharged to the space, wherein
- the partition wall has the ventilation hole at a position not facing sheets stacked on the discharge tray.

3. The image forming apparatus according to claim 1, further comprising:
- a board component provided in the housing in an overlapping manner on a side opposite to the space of the housing.

4. The image forming apparatus according to claim 1, wherein
- the housing has a partition wall on the power supply unit side of the space, and
- the partition wall has a plurality of ventilation holes penetrating from the space toward the power supply unit side at a position facing the power supply unit.

5. The image forming apparatus according to claim 4, further comprising:
- a discharge tray configured to stack sheets discharged to the space, wherein
- the partition wall has the plurality of ventilation holes at a position not facing sheets stacked on the discharge tray.

6. The image forming apparatus according to claim 1, wherein
- the power supply unit includes comprises a cooling duct with an exhaust port that communicates with the space and a suction port located at a position facing a plurality of slit-shaped ventilation holes of a rear panel of the housing.

7. The image forming apparatus according to claim 6, wherein
- the power supply unit includes a blower fan provided in the cooling duct.

8. The image forming apparatus according to claim 1, wherein
- the power supply unit comprises at least two transformers and a heat sink.

9. A multifunction peripheral, comprising:
- a printer component;
- a scanning component;
- a copy component;
- a housing having a space for internal sheet discharging; and
- a power supply unit provided in the housing and adjacent to the space,
- wherein
  - the power supply unit includes a heat-generating electronic component, and the heat-generating electronic component is located at a position adjacent to the space,
  - the housing has a partition wall on the power supply unit side of the space, and
  - the partition wall has a ventilation hole penetrating from the space toward the power supply unit side at a position facing the power supply unit.

10. The multifunction peripheral according to claim 9, further comprising:
- a discharge tray configured to stack sheets discharged to the space, wherein
- the partition wall has the ventilation hole at a position not facing sheets stacked on the discharge tray.

11. The multifunction peripheral according to claim 9, further comprising:

a board component provided in the housing in an overlapping manner on a side opposite to the space of the housing.

12. The multifunction peripheral according to claim 9, wherein the housing has a partition wall on the power supply unit side of the space, and the partition wall has a plurality of ventilation holes penetrating from the space toward the power supply unit side at a position facing the power supply unit.

13. The multifunction peripheral according to claim 12, further comprising:

a discharge tray configured to stack sheets discharged to the space, wherein the partition wall has the plurality of ventilation holes at a position not facing sheets stacked on the discharge tray.

14. The multifunction peripheral according to claim 9, wherein the power supply unit includes comprises a cooling duct with an exhaust port that communicates with the space and a suction port located at a position facing a plurality of slit-shaped ventilation holes of a rear panel of the housing.

15. The multifunction peripheral according to claim 14, wherein the power supply unit includes a blower fan provided in the cooling duct.

16. The multifunction peripheral according to claim 9, wherein the power supply unit comprises at least two transformers and a heat sink.

17. An image forming apparatus, comprising:

a housing having a space for internal sheet discharging; and a power supply unit provided in the housing and adjacent to the space, wherein the power supply unit includes a heat-generating electronic component, and the heat-generating electronic component is located at a position adjacent to the space, the housing has a partition wall on the power supply unit side of the space, and the partition wall has a plurality of ventilation holes penetrating from the space toward the power supply unit side at a position facing the power supply unit.

18. The image forming apparatus according to claim 17, further comprising:

a discharge tray configured to stack sheets discharged to the space, wherein the partition wall has the plurality of ventilation holes at a position not facing sheets stacked on the discharge tray.

* * * * *